United States Patent
Weidenweber et al.

(10) Patent No.: US 6,244,393 B1
(45) Date of Patent: Jun. 12, 2001

(54) DISC BRAKE CALIPER

(75) Inventors: Michael Weidenweber, Frankfurt; Helmut Rückert, Reinheim, both of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/297,008

(22) PCT Filed: Oct. 16, 1997

(86) PCT No.: PCT/EP97/05707

§ 371 Date: Jul. 21, 1999

§ 102(e) Date: Jul. 21, 1999

(87) PCT Pub. No.: WO98/19075

PCT Pub. Date: May 7, 1998

(30) Foreign Application Priority Data

Oct. 26, 1996 (DE) .............................. 196 44 552

(51) Int. Cl.[7] .............................. F16D 65/16; F16D 65/20
(52) U.S. Cl. ...................... 188/72.4; 188/71.8; 188/370; 188/196 P; 188/72.3
(58) Field of Search ................... 188/72.4, 71.8, 188/370, 196 P, 71.7, 72.3, 71.1, 72.5, 216, 196 R; 277/584, 587, 565; 92/168

(56) References Cited

U.S. PATENT DOCUMENTS

| | | | |
|---|---|---|---|
| 3,377,076 | * 4/1968 | Burnett | 188/72.4 |
| 3,915,461 | * 10/1975 | Gautier | 92/168 |
| 4,352,498 | * 10/1982 | Burke et al. | . |
| 4,387,901 | 6/1983 | Ritsema | . |
| 5,076,593 | * 12/1991 | Sullivan et al. | 188/72.4 |
| 5,325,940 | 7/1994 | Rueckert et al. | . |
| 5,826,681 | * 10/1998 | Kubo et al. | 188/71.8 |

FOREIGN PATENT DOCUMENTS

| | | |
|---|---|---|
| 1264889 | * 3/1968 | (DE) . |
| 23 26 047 U | 12/1973 | (DE) . |
| 32 41 164 | 5/1984 | (DE) . |
| 42 02 927 | 8/1993 | (DE) . |
| 0088689 | * 9/1983 | (EP) . |
| 2 186 100 | 1/1974 | (FR) . |
| 2377558 | * 8/1978 | (FR) . |
| 1512778 | * 6/1978 | (GB) . |
| 2 129 878 | 5/1984 | (GB) . |
| 7-301264 | 11/1995 | (JP) . |

OTHER PUBLICATIONS

Search Report of the German Patent Office for Application No. 196 44 552.3.

* cited by examiner

Primary Examiner—Douglas C. Butler
(74) Attorney, Agent, or Firm—Rader, Fishman & Grauer PLLC

(57) ABSTRACT

A disc brake caliper including a brake piston movably arranged therein. The brake piston is sealed in relation to the brake cylinder by a sealing ring, which is arranged in a circumferential annular groove of the brake cylinder. The sealing ring functions to retract the brake piston in the brake cylinder after a braking operation in order to provide a clearance between a brake shoe and a brake disc. According to the present invention, the annular groove includes a recess, which is arranged in the area of transition between a groove wall and the cylinder surface. The contour line, which defines the cross-section of the recess, starting from the groove wall of the annular groove, passes from a convexly curved portion over into a concavely curved portion. This permits ensuring an unchangingly constant clearance between the brake shoe and the brake disc roughly irrespective of the hydraulic pressure.

3 Claims, 2 Drawing Sheets

DISC BRAKE CALIPER

TECHNICAL FIELD

The present invention relates to a disc brake caliper and more particularly relates to sealing rings used in disc brake calipers.

BACKGROUND OF THE INVENTION

A generic disc brake caliper is disclosed in German patent application No. 42 02 927. The prior art disc brake caliper includes a hydraulic actuating device, which is comprised of an open brake cylinder and a brake piston, which axially slidably arranged in the brake cylinder. The brake piston and the brake cylinder are sealed in relation to each other by means of a sealing ring, which is mounted in a circumferential annular groove in the inside of the brake cylinder and is in frictional abutment on an external peripheral surface of the brake piston for sealing purposes. The purpose of the sealing ring not only is to seal the interior of the brake cylinder. The sealing ring, due to its elastic properties, additionally assists in adjusting a clearance between the friction surfaces of the brake shoes and the brake disc after the brake application.

Upon brake application, hydraulic pressure is applied to the brake piston and causes it to move out of the brake cylinder in an axial direction. Upon axial displacement of the brake piston, the sealing ring, which bears against the external peripheral surface of the brake piston, is deformed elastically due to the friction (in first line: static friction) between the sealing ring and the brake piston. Upon termination of the brake application, i.e., when the hydraulic brake system is relieved from load, the elastic sealing ring will return to its original shape and shift the brake piston by a small amount into the brake cylinder. A brake shoe, which abuts the brake piston, follows the axial displacement of the brake piston, and its friction surface is lifted from the brake disc so that a clearance is maintained between the brake shoe and the brake disc.

The amount of the adjusted clearance generally depends on the characteristics of the sealing ring and the annular groove accommodating the sealing ring, especially the cross-sectional shape of the annular groove. Another undesirable relationship is associated with the hydraulic pressure, which prevails in the brake cylinder during brake application: The higher the hydraulic pressure, the more the sealing ring deforms. Attempts have generally been made to maintain an unchanging constant clearance after each brake application irrespective of the hydraulic pressure that occurs. To achieve this objective, a plurality of various cross-sectional shapes for the annular groove have been proposed so far. However, none of the cross-sectional shapes permitted achieving a fixed clearance irrespective of the hydraulic pressure.

For example, in the disc brake caliper disclosed in German patent application No. 42 02 927, a transition area, which is defined by adjacent circumferential conical surfaces or torus surfaces, is provided between the annular groove wall and the cylinder surface. The sealing ring is urged, at least in part, into this transition area during brake application. However, this embodiment does not either ensure a pressure-independent clearance. Further, damage to the sealing ring may be caused, especially when high hydraulic pressures are applied, because the sealing ring will yield far into the acutely tapering transition area in this case. This will greatly reduce the useful life of a sealing ring of this type.

An object of the present invention is to improve a generic disc brake caliper with respect to its clearance. The special objective is to achieve a fixed clearance irrespective of the hydraulic pressure applied.

This object is achieved by the present invention by fashioning a circumferential recess in the transition area between the brake cylinder surface and the groove wall of the annular groove, which is oriented substantially vertically to the brake piston axis. The recess is defined in its cross-section by a contour line, which starts from the groove wall in a convex curvature and passes over into a concave curvature. Depending on the hydraulic pressure applied, a corresponding elastic deformation of the sealing ring into the circumferential recess is permitted. The circumferential recess is in first line arranged at that groove wall of the annular groove, which is closest to the open end of the brake cylinder.

To minimize damages to the material of the elastic sealing ring, the sectionwise different radii of curvature of the contour line of the cross-section of the recess will continuously pass into one another in a preferred embodiment of the disc brake caliper. The fabrication of the recess may be simplified by defining the recess at least in sections by circumferential conical partial surfaces.

In a preferred aspect of the cross-section of the recess, the contour line and the brake cylinder surface form a preferably right angle. This reduces symptoms of wear on the sealing ring, especially at high hydraulic pressures.

Another preferred aspect of the cross-section of the recess is obtained by providing a radial elevation in the contour line so that the free space available for the elastic deformation of the sealing ring is contracted. This avoids an excessive deformation of the sealing ring into the recess at medium hydraulic pressures.

DETAILED DESCRIPTION OF THE PREFERRED EMBODIMENTS

Figure 1:
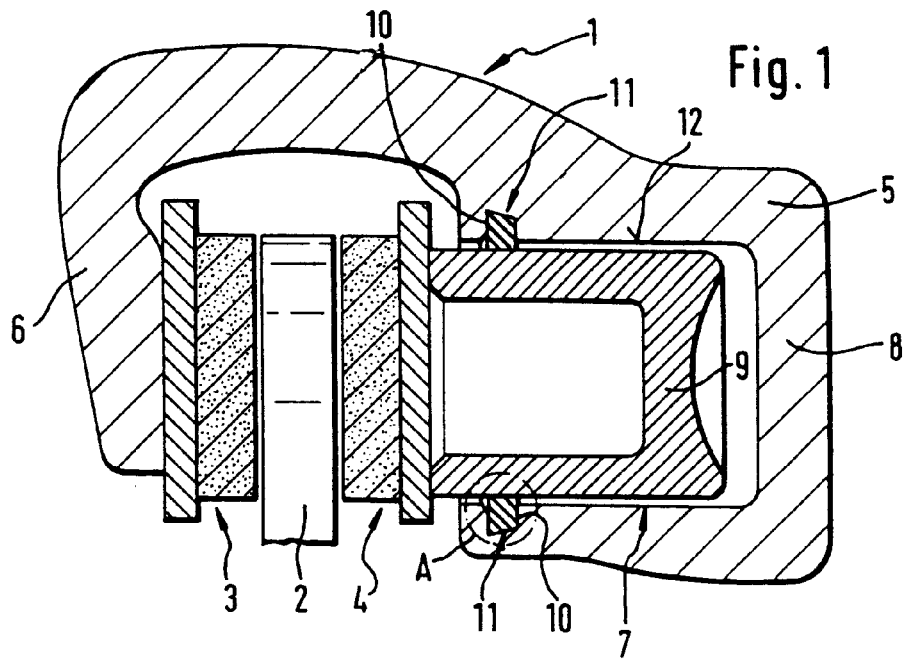
FIG. 1 is a cross-sectional diagrammatic sketch of a disc brake caliper according to the present invention.
Figure 2:
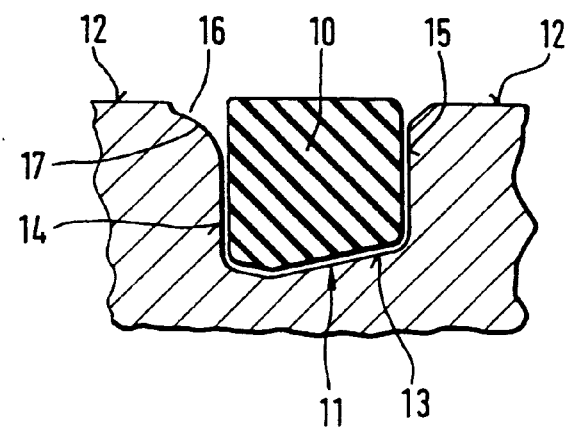
FIG. 2 an enlarged view of detail A in FIG. 1.

The disc brake caliper 1 illustrated in FIG. 1 straddles the outside edge of a brake disc 2, as well as brake shoes 3, 4 arranged on either side of the brake disc 2. The disc brake caliper 1 includes an axially inward leg 5 and an axially outward leg 6, against, which the axially outer brake shoe 3 is directly bearing. The inward caliper leg 5 has a hydraulic actuating device 7 which is comprised of a brake cylinder 8 and a brake piston 9. The brake piston 9 is axially slidable in the brake cylinder 8. With its end projecting from the open brake cylinder 8, the brake piston 9 abuts on the axially inner brake shoe 4. Brake piston 9 is sealed in relation to the brake cylinder 8 by means of an elastic sealing ring 10. The sealing ring 10 is accommodated in a circumferential annular groove 11 in the inside of the brake cylinder 8. Groove 11 is indented into the cylinder surface 12 of the brake cylinder 8. The annular groove 11 is generally comprised of a groove bottom 13, which extends transversely to the cylinder surface 12, and two groove walls 14, 15, which are oriented substantially vertically to the brake cylinder axis. Apart from providing hydraulic sealing, the sealing ring 10 still has the function of retracting the brake piston 9 along with the brake shoe 4 connected thereto, if possible to its initial position, upon termination of brake application and, thus, reduction of the hydraulic pressure. This adjusts a clearance between the brake shoe 4 and the brake disc 2. To this end, the annular groove 11 is provided with a circumferential recess 16 in its transition area between the cylinder surface 12 and the groove wall 14. When the brake is applied, the sealing ring 10, which is in frictional abutment on the brake piston 9 is entrained by the axially displacing brake piston 9 and thus yields elastically into the recess 16.

Figure 3:
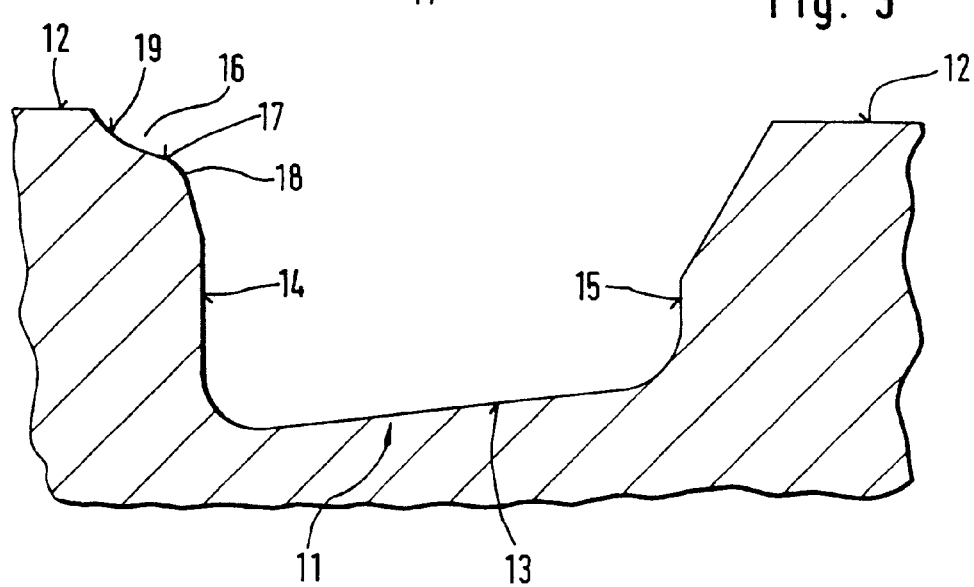
FIG. 3 is an enlarged cross-sectional view of an annular groove with a recess.
Figure 4:
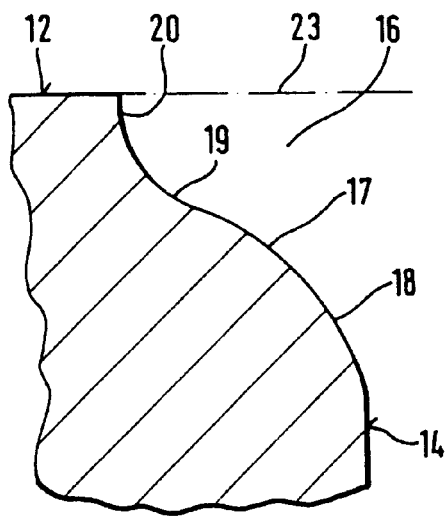
FIGS. 4, 5, 6 and 7 are enlarged cross-sectional views of different embodiments of the recess at the annular groove.

The embodiment of FIG. 3 shows an enlarged cross-sectional view of the annular groove 11 with the adjacent recess 16. It can be seen that the contour line 17, which defines the cross-section of the recess, starting from the groove wall 14, commences with a convexly curved portion 18 and passes into a concavely curved portion 19. The circumferential recess 16 is arranged at that groove wall 14 of the annular groove 11, which is closest to the open end of the brake cylinder 8. When the brake is applied at low hydraulic pressure, the sealing ring 10, due to the convex curvature 18, yields elastically into the recess 16 only to a small extent. In addition, the recess 16 still has sufficient space in the area of the concavely curved portion 19 of the contour line 17, which is provided to accommodate the elastic deformation of the sealing ring 10 when exposed to high hydraulic pressure. This achieves the possibility of adjusting an unchangingly constant clearance, which is roughly irrespective of pressure.

Figure 5:
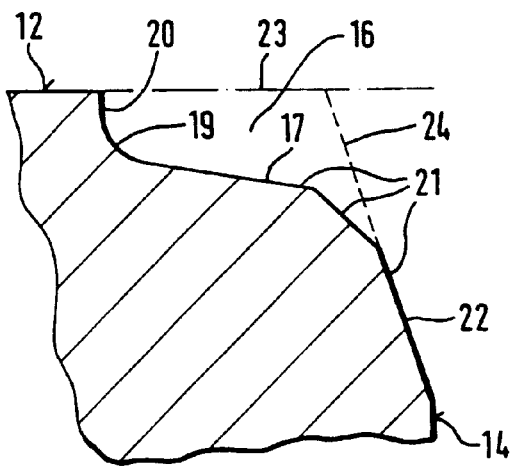

FIGS. 4 to 7 show enlarged views of different embodiments of circumferential recesses 16 at the annular groove 11, which are different regarding the course of the contour line 17 defining the cross-section of the recess. Seen in FIG. 4 can be seen a roughly S-shaped course of the contour line 17 which is produced when the contour line 17, starting from the groove wall 14, passes from a convexly curved portion 18 into a concavely curved portion 19. The sectionwise different radii of curvature of the contour line 17 have tangential transitions, whereby material wear on the sealing ring 11 is reduced. When the brake is applied at low hydraulic pressure, the sealing ring 11 will yield only partly into the recess 16, roughly in the area, which is defined by the convexly curved portion 18. Only at very high hydraulic pressure in the brake system will the elastic sealing ring 11 yield into the entire cross-section of the recess 16, when the brake is applied, until its elastic deformation comes to a stop by abutment on a stop surface 20. The stop surface 20, which, preferably in all embodiments of the recess 16, is at a right angle (which is preferred) to the cylinder surface 12 in the direct area of transition to the brake cylinder, limits the elastic deformation of the sealing ring 11 in an axial direction. This prevents above all an excessive wear of material on the sealing ring 11. With a reduction of hydraulic pressure in the brake system, the sealing ring 11 will deform axially into its initial position (provided a material with appropriate elastic properties has been chosen) and entrains the brake piston 9 by frictional abutment on its peripheral surface. This general mode of operation may also be transferred to the variations of FIGS. 5 to 7, which have a different configuration. In FIG. 5, the area of the contour line 17, which is adjacent to, the groove wall 14 of the annular groove 11 has straight portions 21 for reasons of simplification of manufacture. The contour line 17 is at least partly comprised of portions of a simple geometric outline, such as a straight line, and thus permits favorably manufacturing the recess by way of machining operations. In particular, the straight portion 21, which is directly adjacent to the groove wall 14 and has a slight angle relative to, the groove wall has the special purpose of providing a stop surface 22 for the sealing ring 10 when low pressure prevails in the brake system. In such a case of operation, the sealing ring 10 is deformed elastically to contact the abutment surface 22 and, extending further into the interspace until it comes into contact with the peripheral surface 23 of the brake piston (see dash-and-dot line in FIGS. 4 to 7), yields only to a slight extent into the recess 16 as is shown by the sealing ring contour 24 in FIGS. 5 to 7. Only at a considerably higher hydraulic pressure will the recess 16 be filled to a greater degree by the elastically deformed sealing ring 10. This provides the possibility of adjustment of an unchangingly constant clearance over a very wide pressure range.

Figure 6:
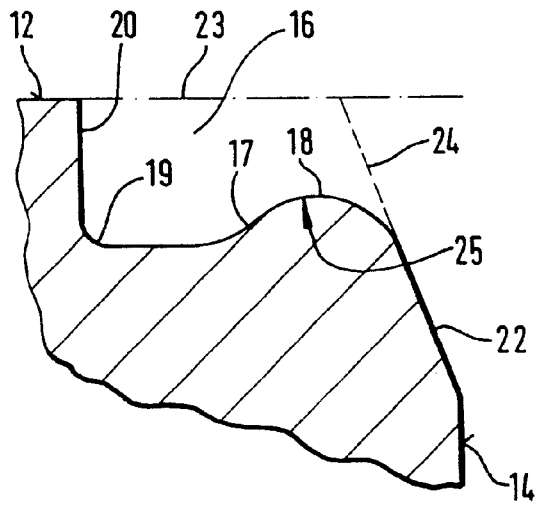
Figure 7:
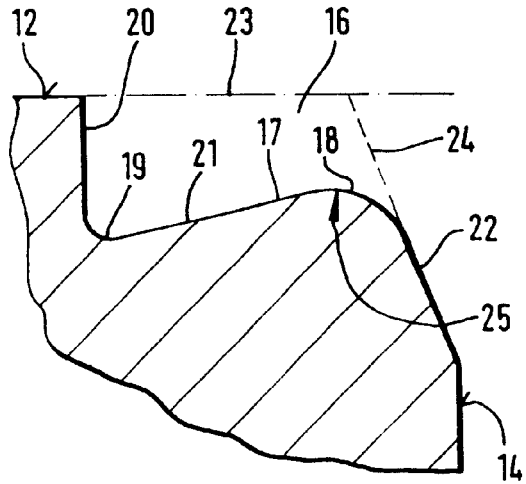

The variations shown in FIGS. 6 to 7 illustrate another approach of achieving a constant clearance, which is irrespective of pressure. The contour line 17, which defines the cross-section of the recess 16, includes a radial elevation 25 on its right-hand side close to the annular groove 11 in FIGS. 6 and 7. The free distance between the contour line 17 and the peripheral surface 23 of the brake piston is contracted by this radial elevation 25. This produces an obstacle for the sealing ring 10, which yields elastically into the recess 16, especially when the brake is applied at medium hydraulic pressure. Only with further pressure rise will the sealing ring 10 be in a position to overcome the contraction between the contour line 17 and the peripheral surface 23 of the brake piston and to fill the left-hand area of the recess 16 (see FIGS. 6 and 7), which lies axially behind the contraction. The unchangingly constant clearance can be adjusted by this provision over a wider range of hydraulic pressure.

The manufacture is additionally simplified also for the variations according to FIGS. 6 and 7 by composing the contour line 17 at least in part of straight portions 21. This becomes apparent especially in FIG. 7 in the connecting portion between the convexly curved portion 18 and the concavely curved portion 19.

What is claimed is:

1. Disc brake caliper comprising:

a hydraulic actuating device which includes a brake cylinder with an open end, a brake piston, which is axially movably arranged therein, the actuating device having an elastic sealing mounted in a circumferential annular groove in the inside of the brake cylinder and being in frictional abutment for sealing an external peripheral surface of the brake piston, wherein said circumferential annular groove includes groove walls, and wherein at least one of the groove walls of the annular groove includes a circumferential recess in the area of transition between the cylinder surface of the brake cylinder and the groove wall of the annular groove, into which recess the sealing ring is urged elastically by the brake piston, which is moved in an axial direction when the brake is applied, wherein the circumferential recess is arranged at the groove wall of the annular groove that is closest to the open end of the brake cylinder, and in its cross-section is defined by a contour line, which, starting from the groove wall of the annular groove adjacent to the recess at a right angle between the contour line and the cylinder surface, passes from a convex curvature over into a concave curvature, and the sectionwise different radii of curvature of the contour line of the cross-section of recess tangentially pass into one another.

2. Disc brake caliper as claimed in claim 1, wherein the contour line, at least in part, has straight portions.

3. Disc brake caliper as claimed in claim 1, wherein the contour line which defines the cross-section of the recess includes a radial elevation so that the free space between the contour line and the peripheral surface of the brake piston is contracted.

* * * * *

UNITED STATES PATENT AND TRADEMARK OFFICE
CERTIFICATE OF CORRECTION

PATENT NO. : 6,244,393 B1
DATED : June 12, 2001
INVENTOR(S) : Michael Weidenweber and Helmut Ruckert It is certified that error appears in the above-identified patent and that said Letters Patent is hereby corrected as shown below:

Column 4,
Line 50, replace "elastic sealing mounted" with -- elastic sealing ring mounted --.

Signed and Sealed this

Twentieth Day of August, 2002

*Attest:*

JAMES E. ROGAN
*Attesting Officer*   *Director of the United States Patent and Trademark Office*